(12) United States Patent
Nayak et al.

(10) Patent No.: US 11,429,351 B2
(45) Date of Patent: Aug. 30, 2022

(54) METHODS AND SYSTEMS FOR BUILDING CUSTOM AUTOMATION WORKFLOWS TO INTEGRATE MULTIPLE APPLICATIONS

(71) Applicant: INTUIT INC., Mountain View, CA (US)

(72) Inventors: Siben Nayak, Bangalore (IN); Govinda Sambamurthy, Bangalore (IN); Anil Sharma, Bangalore (IN); Srivatsan Vijayaraghavan, Bangalore (IN); Nishant Sehgal, Bangalore (IN); Sandeep Gupta, Bangalore (IN); Shirish Peshwe, Bangalore (IN); Archit Singh, Bangalore (IN); Harsh Madhogaria, Bangalore (IN); Jitin Maherchandani, Bangalore (IN); Shyamalendu Tripathy, Bangalore (IN)

(73) Assignee: INTUIT INC., Mountain View, CA (US)

(*) Notice: Subject to any disclaimer, the term of this patent is extended or adjusted under 35 U.S.C. 154(b) by 0 days.

(21) Appl. No.: 17/153,919

(22) Filed: Jan. 21, 2021

(65) Prior Publication Data
US 2022/0229636 A1    Jul. 21, 2022

(51) Int. Cl.
*G06F 8/20* (2018.01)
*G06N 20/00* (2019.01)
*G06F 9/50* (2006.01)
*G06F 9/54* (2006.01)

(52) U.S. Cl.
CPC .............. *G06F 8/22* (2013.01); *G06F 9/5027* (2013.01); *G06F 9/543* (2013.01); *G06N 20/00* (2019.01)

(58) Field of Classification Search
CPC ............ G06F 8/22; G06F 9/5027; G06F 9/543
USPC ................................. 717/104–120; 706/45–50
See application file for complete search history.

(56) References Cited

U.S. PATENT DOCUMENTS

| | | | |
|---|---|---|---|
| 5,774,661 A * | 6/1998 | Chatterjee .............. | G06F 9/5038 709/238 |
| 7,580,911 B2 * | 8/2009 | Sun ....................... | G06Q 10/103 706/50 |
| 7,676,294 B2 * | 3/2010 | Baier ..................... | G06Q 10/06 702/182 |

(Continued)

OTHER PUBLICATIONS

Oasha et al., "Towards Automated Workflow Deployment in the Cloud using TOSCA", IEEE, pp. 1037-1040 (Year: 2015).*

(Continued)

*Primary Examiner* — Anil Khatri
(74) *Attorney, Agent, or Firm* — DLA Piper LLP (US)

(57) ABSTRACT

A workflow construction system for constructing automation workflows that automate user specific processes. The workflow construction system may include a template library including workflow templates and pre-configured attributes. The workflow template can accelerate the design and construction of custom automation workflows. An orchestration layer included in the workflow construction system will also improve the performance of systems that execute the automation workflows by dynamically scaling the processing capacity, memory, and storage of servers and other systems hosting the model file instances of the automation workflows to ensure the available resources meet the demands of users completing processes using the automation workflows.

16 Claims, 6 Drawing Sheets

(56) References Cited

U.S. PATENT DOCUMENTS

| | | | | |
|---|---|---|---|---|
| 7,756,915 | B2* | 7/2010 | Ben-Yaacov | G11B 31/02 |
| | | | | 725/139 |
| 7,895,566 | B2* | 2/2011 | Shenfield | G06F 8/20 |
| | | | | 717/106 |
| 8,639,555 | B1* | 1/2014 | Johnston | G06Q 10/0631 |
| | | | | 705/7.27 |
| 8,887,134 | B2* | 11/2014 | Weatherhead | G06F 30/00 |
| | | | | 717/121 |
| 10,476,971 | B2* | 11/2019 | Holmes-Higgin | G06Q 10/04 |
| 10,554,817 | B1* | 2/2020 | Sullivan | H04L 41/5054 |
| 10,963,231 | B1* | 3/2021 | Singh | G06N 20/00 |
| 11,194,576 | B1* | 12/2021 | Botha | G06Q 10/0631 |
| 11,200,539 | B2* | 12/2021 | Iyer | G06Q 10/06316 |
| 11,301,269 | B1* | 4/2022 | Singh | G06N 20/00 |
| 11,321,772 | B2* | 5/2022 | Amtrup | H04N 1/00334 |
| 11,347,613 | B2* | 5/2022 | Singh | G06F 11/0754 |

OTHER PUBLICATIONS

Alhuzali et al., "Chainsaw: Chained Automated Workflow-based Exploit Generation", ACM, pp. 641-652 (Year: 2016).*

Dey, "A Declarative Approach To Customize Workflow Provenance", ACM, pp. 9-16 (Year: 2013).*

Palaniappan et al, Special Purpose Simulation Template for Workflow Analysis in Construction:, IEEE, pp. 2090-2098 (Year: 2017).*

Lin et al, "A Reference Architecture for Scientific Workflow Management Systems and the View SOA Solution", IEEE, pp. 79-92 (Year: 2009).*

Huang et al., "SecureFlow: A Secure Web-enabled Workflow Management System", ACM, pp. 83-94 (Year: 1999).*

Gil et al., "Expressive Reusable Workflow Templates", IEEE, pp. 341-351 (Year: 2009).*

Nguyen et al, "An Ontological Approach for Organizing a Knowledge Base to Share and Reuse Business Workflow Templates", IEEE, pp. 271-277 (Year: 2017).*

* cited by examiner

METHODS AND SYSTEMS FOR BUILDING CUSTOM AUTOMATION WORKFLOWS TO INTEGRATE MULTIPLE APPLICATIONS

BACKGROUND

Designing and building automation workflows is a complex and technical process. Automation workflows that complete processes such as data syncs, reviews and approvals, and reminders and notifications are time consuming and expensive to develop using conventional tools. Additionally, the workflows built using conventional tools cannot interface directly with users within other applications. Therefore, customers must learn a new system and constantly monitor the workflows in order to complete the automated processes. This increases the amount of time and resources required to transition from a manual workflow to an automated workflow and reduces the productivity of systems and users. Accordingly, there is a need and desire to streamline building custom automation workflows that integrate with multiple applications.

DETAILED DESCRIPTION OF SEVERAL EMBODIMENTS

The disclosed technology provides a new workflow construction system that streamlines designing and building custom automation workflows that are adapted to user specific processes. The workflow construction system includes a library of pre-set workflow templates and pre-configured attributes (i.e., workflow components). The workflow construction system also enables users to create custom attributes. The custom attributes are auto-configured to be compatible with the workflow templates and pre-configured attributes. The workflow construction system enables custom automation workflows to be designed and built without the time consuming manual setup and configuration required by other automation tools. Users can define any process they wish to automate using the workflow templates, pre-configured attributes, and custom attributes. Automation workflows for the user defined processes are then created with no additional development time or manual coding.

The disclosed technology also adds workflow properties to the custom automation workflows to make the custom automation workflows compatible with multiple applications. The workflow properties integrate the custom automation workflows with the applications customers currently use to complete specific tasks. The application integrations enable the custom automation workflows to create tasks and send notifications to users directly in the applications. Interfacing directly with other applications encourages adopting automated processes by reducing the time and resources required to transition from a manual workflow to an automated workflow. The application integrations also enable the tasks required to complete the custom automation workflows to be accessed and worked on directly in whatever applications are most commonly used by users. Interfacing with users in their preferred working environment results in a better user experience and higher productivity.

Thus, the disclosed technology provides customizable workflow templates and pre-configured attributes that are used to construct user defined automation workflows. The custom automation workflows generated by the workflow construction system interface with multiple applications to distribute tasks and notifications required to complete the automation workflows to users within the applications. As a result, user satisfaction may be improved through faster automation of user specific processes, faster completion of tasks, increased system performance, and lower operating costs. The increased user satisfaction should result in increased product engagement, positive customer ratings, and increased sales.

Figure 1:
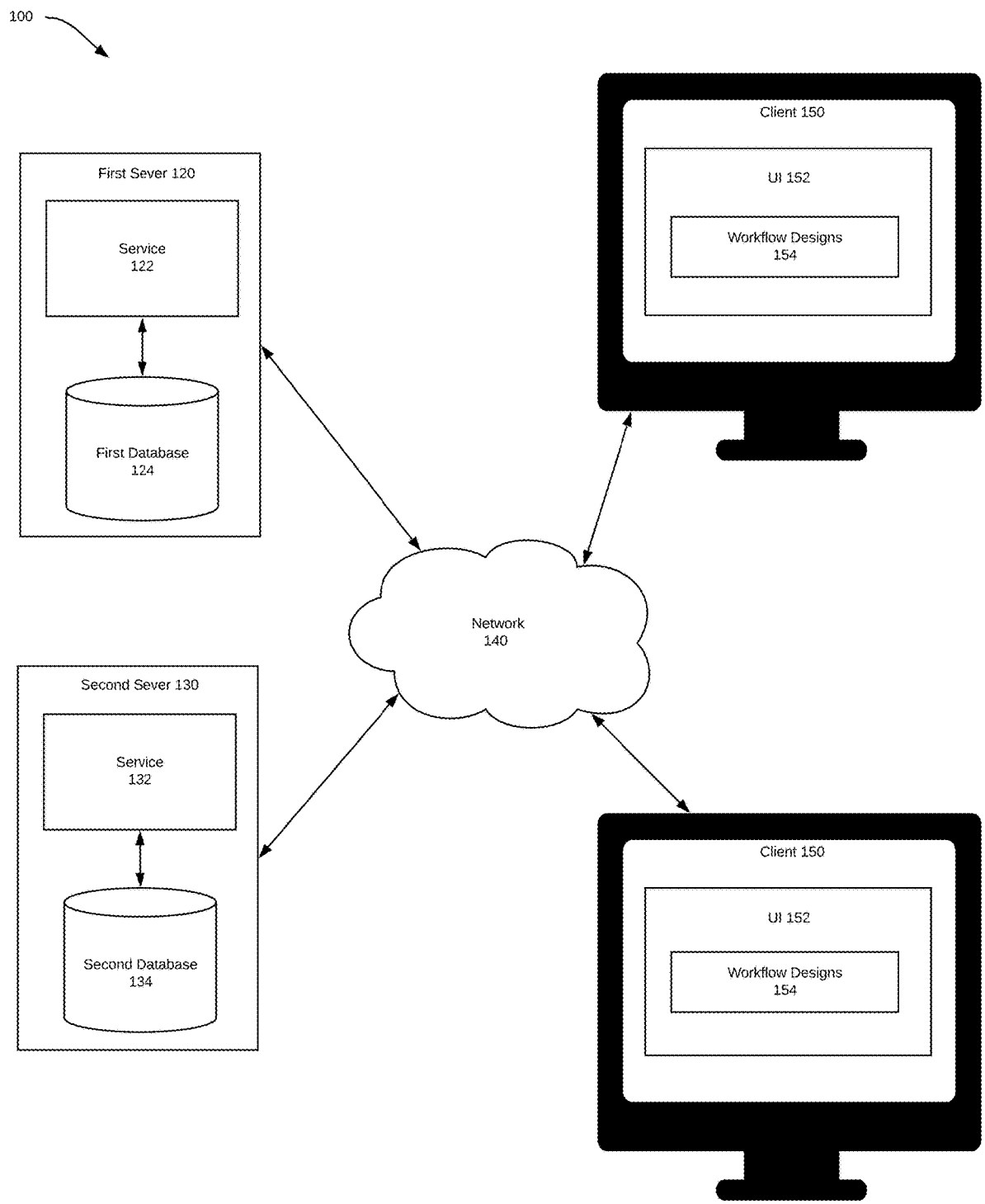
FIG. 1 shows an example system configured to build automation workflows according to various embodiments of the present disclosure.

FIG. 1 shows an example system 100 configured to implement a process for constructing a automation workflow according to an embodiment of the present disclosure. System 100 may include a first server 120, second server 130, and or one or more client devices 150. First server 120, second server 130, and or client device(s) 150 may be configured to communicate with one another through network 140. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 140 may be the Internet and/or other public or private networks or combinations thereof.

First server 120 is configured to implement a first service 122, which in one embodiment is used to construct an automation workflow that automates a business task. The automation workflows generated by the first service 122 can be in the form of a workflow model file that can be transmitted via network 140 to the second sever 130 for execution. In accordance with the disclosed principles, the first service 122 implements a design portal that may be used to build custom automation workflows that automate user specific processes. The custom automation workflows may be based on workflow templates received from one or more databases 124, 134, the second server 130 and or client device(s) 150. In addition, or alternatively, the automation workflows may be constructed using pre-configured attributes (i.e., workflow components) received from one or more databases 124, 134, the second server 130 and or client device(s) 150.

Second sever 130 is configured to implement a second service 132, which in one embodiment, is used to implement an orchestration layer used to execute automation workflow model files generated by the first service 122. The orchestration layer receives automation workflow model files via network 140 from one or more databases 124, 134, the second server 130 and or client device(s) 150. The second service 132 may interface with one or more of the severs 120, 130 or other severs to load and process the workflow model files. The orchestration layer of the second service 132 is used to efficiently execute one or more instances of the workflow model files to improve system performance and reduce operating costs.

Client device(s) 150 may be any device configured to present user interfaces (UIs) 152 and receive inputs thereto. Exemplary client devices 150 may include a personal computer, laptop computer, tablet, smartphone, or other device. The UIs 152 will display instances of the design portal used to generate workflow designs 154. In one or more embodiments, the workflow designs 154 may be generated based on the inputs received by the UIs 152. For example, the inputs received by the UIs 152 may be used to modify one or more workflow templates or build a workflow design 154 from scratch using the pre-configured attributes.

First server 120, second server 130, first database 124, second database 134, and client device(s) 150 are each depicted as single devices for ease of illustration, but those of ordinary skill in the art will appreciate that first server 120, second server 130, first database 124, second database 134, and or client device(s) 150 may be embodied in different forms for different implementations. For example, any or each of the first server 120 and second server 130 can include a plurality of servers or one or more of the first database 124 and second database 134. Alternatively, the operations performed by any or each of first server 120 and second server 130 may be performed on fewer (e.g., one or two) servers. In another example, a plurality of client devices 150 communicate with first server 120 and/or second server 130. A single user may have multiple client devices 150, and/or there may be multiple users each having their own client device(s) 150.

Figure 2:
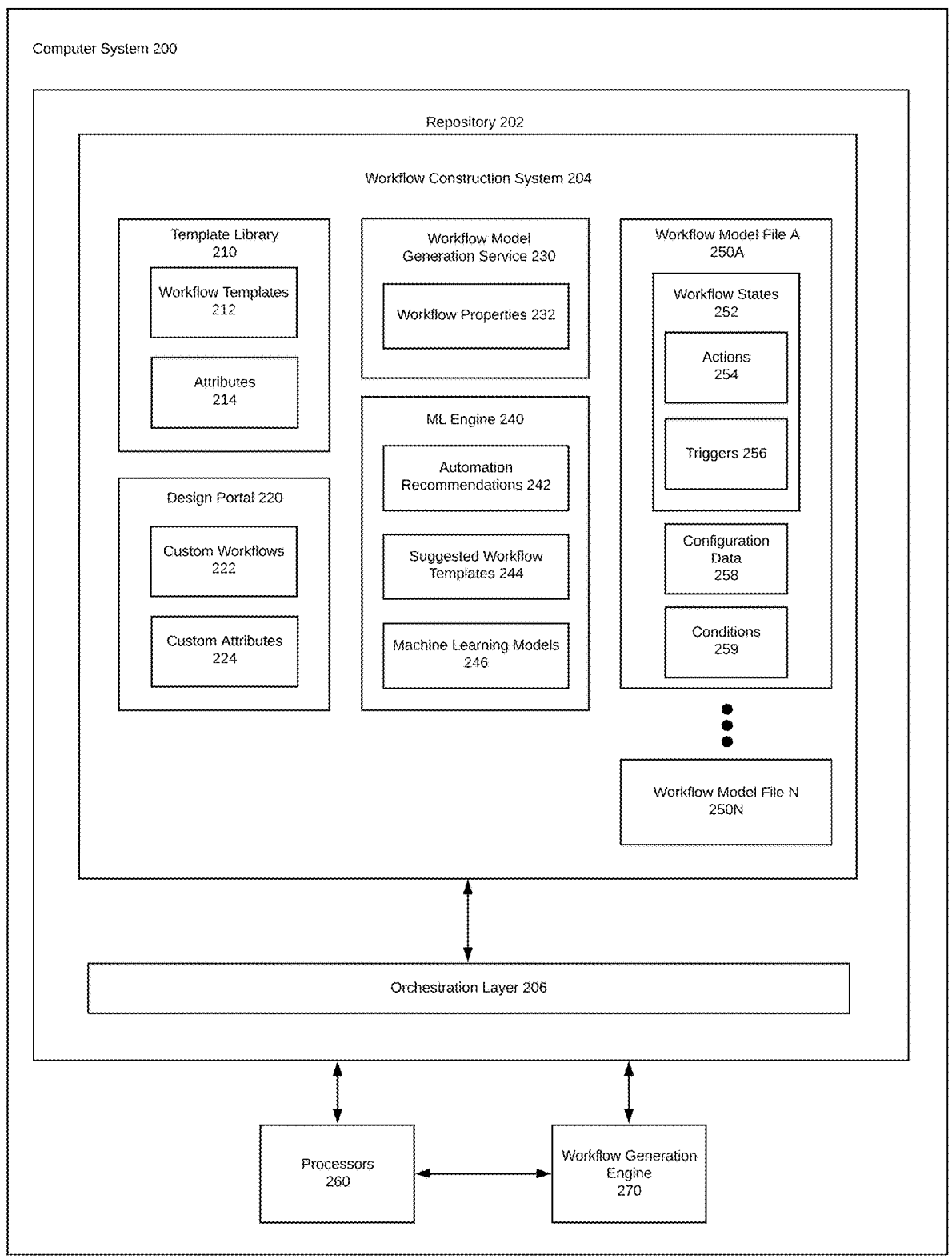
FIG. 2 shows more details of the example system of FIG. 1 according to various embodiments of the present disclosure.

FIG. 2 is a block diagram illustrating an example computer system 200 in accordance with one or more embodiments disclosed herein. The computer system 200 includes a repository 202, a workflow generation engine 270, and one or more computer processors 260. In one or more embodiments, the computer system 200 takes the form of the computing device 600 described in FIG. 6 and the accompanying description below or takes the form of the client device 150 described in FIG. 1. In one or more embodiments, the computer processor(s) 260 takes the form of the computer processor(s) 602 described with respect to FIG. 6.

In one or more embodiments, the repository 202 may be any type of storage unit and/or device (e.g., a file system, database, collection of tables, or any other storage mechanism) for storing data. Further, the repository 202 may include multiple different storage units and/or devices. In one or more embodiments, the repository 202 includes a workflow construction system 204 and an orchestration layer 206.

The workflow construction system 204 generates automation workflows that automate tasks and user specific processes. For example, the automation workflows can automate processes including approvals (e.g., requesting and performing approvals of invoices, estimates, and other documents and decisions), reminders and notifications (e.g., sending reminders for overdue tasks, follow-up messages to customers and sales leads, and other notifications), task management (e.g., creating, assigning, and managing tasks delegated to employees and third parties), data review (e.g., review notifications and tasks for data coining into company systems from external applications), automated updates (e.g., set up auto updates to in-product applications and or transaction based on conditions), onboarding of live in-product subject matter experts (e.g., educating tax and accounting subject matter experts about how to interact with users on in-product applications), engagement of live in-product subject matter experts (e.g., engaging users with tax and accounting subject matter experts based on one or more conditions), and the like. Each automation workflow includes a plurality of attributes (i.e. workflow states 252, actions 254, triggers 256, and the like) that facilitate completing the process that corresponds to the automation workflow.

Figure 3:
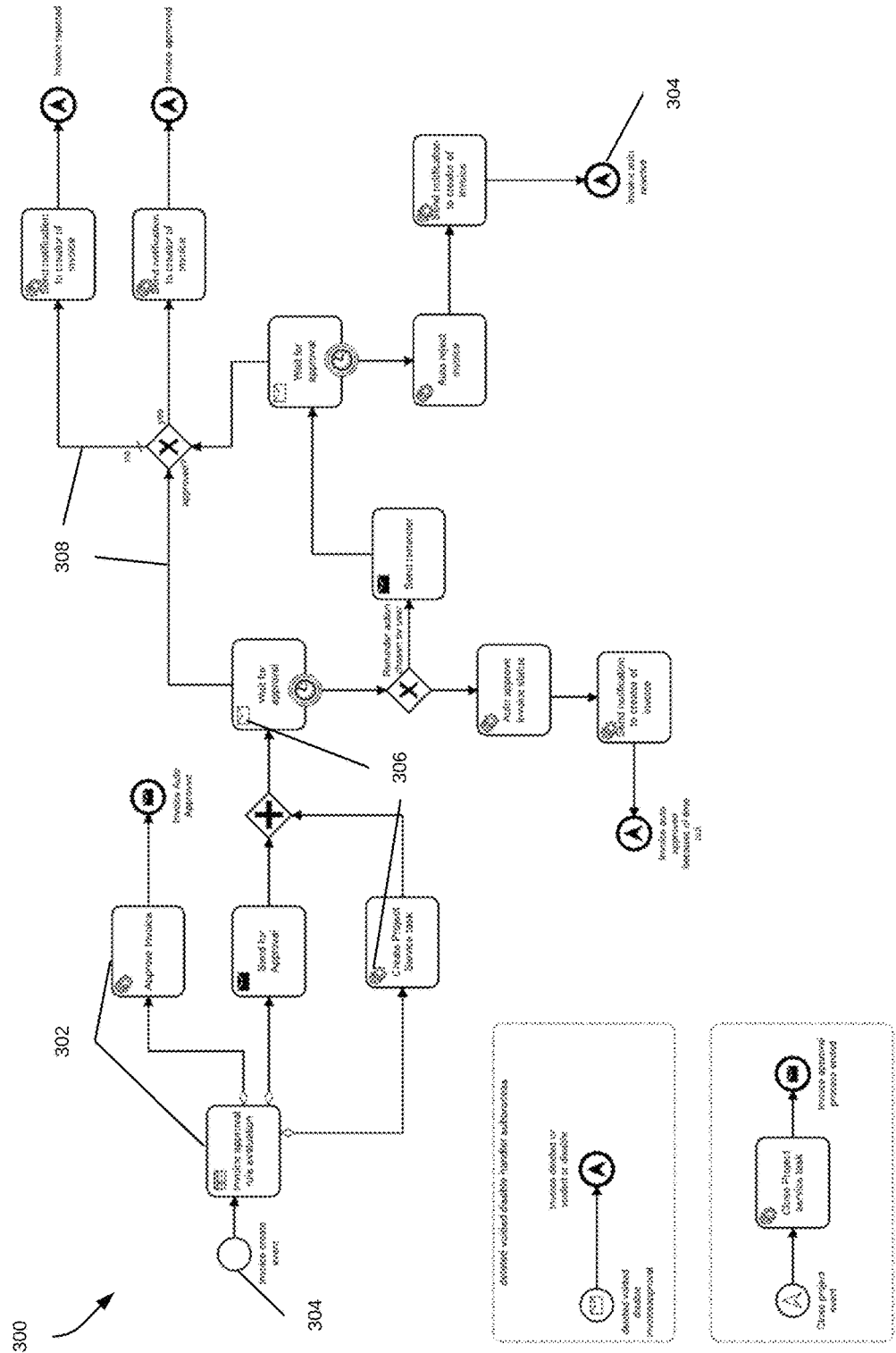
FIG. 3 shows an example automation workflow according to various embodiments of the present disclosure.

FIG. 3 illustrates an example automation workflow 300 that may be designed and constructed using the workflow construction system 204 disclosed herein. Each box 302 included in the automation workflow 300 corresponds to an action 256 included in the workflow model file 250A that automates the process of the automation workflow 300. The arrows 308 that connect the boxes 302 illustrate various paths that may be taken through the automation workflow 300 to complete the process. The circles 304 at the beginning and the end of the automation workflow 300 correspond to the workflow states 252 of the workflow model file 250A. The automation workflow 300 has six workflow states, including a workflow initialization state that begins execution of the automation workflow 300 upon detection of an invoice creation event and five completion states that describe the five possible outcomes that could be achieved (i.e., an invoice is automatically approved because time for review expired, an invoice is automatically approved for other reasons, an invoice is manually approved, an invoice is manually rejected, and an invoice is automatically rejected) by completing the automation workflow 300. The invoice creation event is a trigger 256 that initializes the automation workflow 300.

Each action may include an action type that corresponds to the icons 306 in the upper left corner of each box 302. The icons 306 describe the type of action 254 represented by the box 302. The template library includes multiple pre-configured attributes 214 that may be implemented in automation workflows with no additional development time or manual configuration. For example, the pre-configured attributes 214 may include automated actions, notifications, and rules-based logic. The automated actions may be actions performed by the server executing the workflow model file instances of the automation workflow 300. The notifications may be messages that include subtasks to be completed by employees and other users. The rules-based logic includes decision trees or other logic used to navigate through the automation workflow 300 to different workflow states 252 based on the input received by the workflow model file (e.g., one or more detected triggers 256 and or responses to notifications sent by one or more actions 254). Custom attributes 224 that are not included in the template library 210 may also be constructed using a design portal 220. The custom attributes 224 may include any user defined workflow component (e.g., event, action, trigger, rule, condition, etc.) The custom attributes 224 created by users are auto-configured by the workflow construction system 204 so that they are compatible with the workflow templates 212 and pre-configured attributes 214. For example, the auto-configured custom attributes 224 may be inserted into a workflow template 212 and or interchanged with a pre-configured attribute 214 with no additional coding or manual configuration. The auto-configured custom attributes 224 may also be added to the template library 210 for future use.

Figure 4:
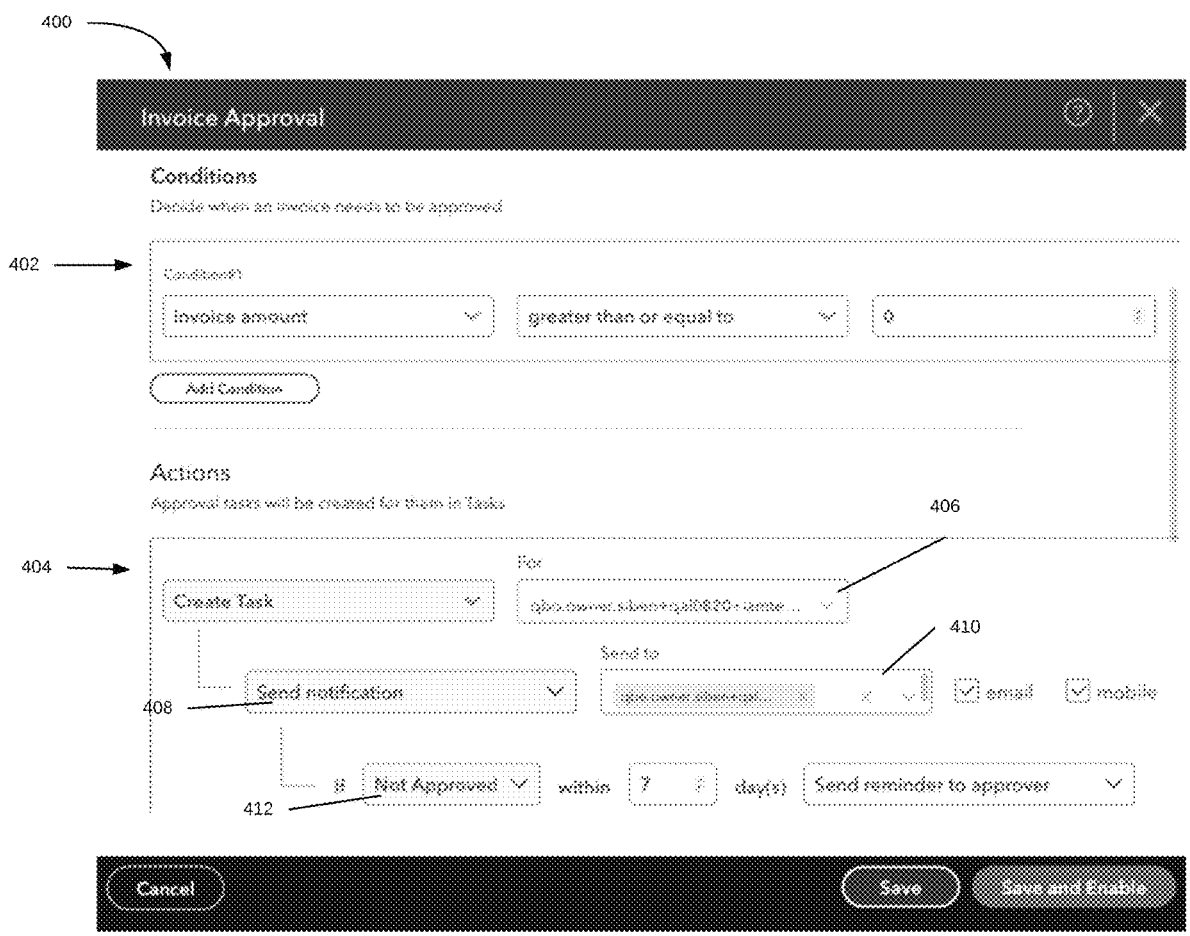
FIG. 4 shows an example user interface for constructing an automation workflow according to various embodiments of the present disclosure.

In one or more embodiments, the automation workflows are generated using the design portal 220. The design portal includes a user interface UI for designing custom workflows 222. The design portal 220 may also be used to auto-configure the custom attributes 224 that are incorporated into the automation workflows. FIG. 4 illustrates an example workflow design UI 400 used to design custom workflows 222. The illustrated workflow design UI 400 includes a conditions design panel 402 used to create one or more conditions. The conditions generated using the conditions design panel 402 may, for example, control the beginning of the automation workflow, transitions from one workflow state to another workflow state, the end of the automation workflow, and the like. The conditions may be generated by selecting options from a drop down menu including a variety of conditions parameters stored in the design portal 220. Conditions parameters can also be manually entered by typing the particular parameters in the corresponding drop down boxes. In comparison to other automation tools, which require coding custom conditions and other custom attributes in a programming language, custom attributes for the automation workflows are auto-configured by the design portal 220. For example, custom conditions generated in the conditions design panel 402 are augmented with a set or workflow properties that enable the custom conditions to be operable in the workflow templates 212. The workflow properties also ensure the custom conditions can operate with other auto-configured custom attributes 224 and pre-configured attributes 214 so that users can build custom automation workflows using any combination of custom and or pre-configured attributes. Accordingly, the workflow properties enable custom attributes to be incorporated into automation workflows using a simple process that requires less development time, no programming expertise, and no manual coding or configuration.

The illustrated workflow design UI 400 includes an actions design panel 404 used to generate actions 254 included in the automation workflow. The actions design panel 404 may include a drop down menu for selecting options from a drop down menu including a variety of actions parameters stored in the design portal 220. Users may also create a user defined action by entering user defined action parameters manually by typing in the boxes of the drop down menu. For example, the action parameters may include action identification information 406 for the user(s) or computer system(s) assigned to receive the actions 254 and instructions 408 to perform the processing steps required by the action 254 (e.g., instructions to send a notification that distributes a subtask to the user(s) and or computer system(s) according to the contact information 410). The actions design panel 404 may also allow conditional logic 412 to be added to the instructions 408. The conditional logic 412 defines when to perform the processing steps included in the instructions 408 (i.e., send the notification after detecting a specific trigger and or condition) and or additional instructions related to the action and or subtask included in the action. For example, the conditional logic 412 for the send notification action may include a condition to send a reminder notification to complete the subtask mentioned in the notification if the subtask is not completed within seven days of sending the notification. In comparison to other automation tools which require user defined automation workflow actions, instructions for performing the actions, and condition logic related to the actions to be manually coded in a programming language, actions and conditional logic for the automation workflows are generated, modified, and automatically configured in the actions design panel 404 with no additional development time, manual coding or configuration, or programming expertise.

Referring again to FIG. 2, to facilitate rapid design and construction of the automation workflows, the workflow construction system 204 includes a template library 210. The template library 210 includes workflow templates 212 and attributes 214. The workflow templates 212 include pre-set automation workflows for generic processes and tasks. For example, the workflow templates 212 may include automation workflows for processes that include approvals, reminders and notifications, task management, data review, automatic updates, expert onboarding, expert engagement, and the like. The pre-configured attributes 214 include workflow states 252, actions 254, and triggers 256 that are required complete the processes automated by the workflow templates 212 The attributes 214 are pre-configured by pre-setting the configuration data 258 and conditions 259. For example, the attributes 214 can be pre-configured by pre-coding integrations with applications connected to the automation workflows (i.e., applications that are updated by automation workflows, applications that have events that are used as triggers 256, applications that include data used or generated by automation workflows, and the like). The attributes 214 can also be pre-configured by automatically assigning the roles and permissions for users and computer systems required to complete subtasks included in the actions 254 and or receive reminders and or notifications. The attributes 214 can also be pre-configured by automatically setting one or more conditions for executing automation workflows and or transitioning between states 252. For example, a condition for executing an invoice approval workflow may be pre-set to receive an invoice of a particular dollar amount (e.g., an invoice for more than $1,000). A condition for triggering completion of the invoice review state of the approval workflow may be pre-set to completing an invoice review action.

The pre-set workflow templates 212 and pre-configured attributes 214 are used to rapidly design and construct automation workflows that automate user specific processes. The pre-set workflow templates 212 are used to design an automation workflow for a user specific process in a fraction of the time relative to other automation tools that do not have pre-set workflows and require each automation workflow to be designed from scratch. The pre-configured attributes 214 enable the processing steps required to execute the automation workflows to be performed with no additional development time, manual coding or configuration, or expert programming knowledge. In comparison to other automation tools that require manual coding and configuration of the processing steps required by automation workflows, the pre-configured attributes 214 reduce the time required to develop the automation workflows and improve the performance of host servers executing model file instances of automation workflows.

The template library 210 may be expanded to include custom workflows 222 and custom attributes that are constructed in the design portal 220. For example, custom workflows 222 that automate processes that are not associated with any of the workflow templates 212 may be added to the template library 210. Additionally, custom workflows 222 that modify one or more of the workflow templates 212 to fit user specific processes and systems may also be added the template library 210. Custom attributes 224 including new states 252, actions 254, and triggers 256 may also be added to the template library 210. For example, new actions 254 including calculations, new conditional logic, and the like may be added to the template library 210. Other triggers 256 including events and or data from a new application (i.e., an application that was previously not connected to the automation workflows) may also be added to the template library 210. The template library 210 can be specific to a particular use case, user, project, operation, and or company. The template library 210 can be shared among all users of the workflow construction system 204. Individual workflow templates 212 and or attributes 214 can also be shared among two or more users.

The illustrated workflow construction system 204 includes a machine learning engine 240 which includes multiple machine learning models 246 that generate automation recommendations 242 and suggested workflow templates 244. The automation recommendations 242 may include processes (e.g., approvals, reminders, task management, data review, automatic updates, onboarding and engagement of live experts, and the like) that are candidates for automation using an automation workflow. The automation recommendations 242 may be based on data included in applications connected to the machine learning engine 240. For example, data including the amount of time users spend completing tasks in one or more applications, the number of revisions and or changes made to data, the number of people working on a particular task, the number of applications including data required to complete a task, the number of times a particular task is completed during a pre-defined period of time, and the like may be analyzed to generate automation recommendations 242. For example, if the machine learning engine 240 determines two or more users spend at least 2 hours a week reviewing and approving invoices in a spreadsheet application, the machine learning engine 240 will an automation recommendation 242 to automate the invoice approval process using an automation workflow.

The machine learning models 246 analyze data received from applications connected to the machine learning engine 240 and or automation workflows. The machine learning models 246 may be trained on the application data and may generate the automation recommendations 242 based on insights derived from the training data. The machine learning models 246 may be trained on training data that is specific to a particular group of applications, use cases, process types, companies, operations, subject matter areas (e.g., tax, accounting, law, and the like) and or automation tasks (e.g., reminders, approvals, and the like). In one or more embodiments, the machine learning models 246 may be predictive models generated using a deep learning system including one or more recurrent neural networks having one or more filters, classification layers, and or attention or memory mechanisms. The predictive models may also be generated using one or more machine learning algorithms, including Bayesian networks and other classification algorithms, matrix factorization and other filtering algorithms, and the like.

In one or more embodiments, the machine learning models 246 include a content based recommendation engine that makes recommendations based on other previously automated processes. The features of each process corresponding to an automation workflow included in the workflow construction system 204 can be included in metadata associated with each automation workflow. The metadata may include multiple fields of the application data described above (e.g., the number of times the process is executed in a pre-defined period, the amount of users required to complete the process, the amount of time spent in one or more applications to complete tasks included in the process, and the like). The content based recommendation engine generates a vector representation for the metadata for each process associated with an automation workflow. The content based recommendation engine generates a vector representation for the metadata for a target process. To determine if the target process is a candidate for automation, the content based recommendation engine calculates the distances in a multi-dimension vector space between one or more of the vectors corresponding to the automated process (i.e., the processes with existing automation workflows) and the vector of the target process. The content based recommendation engine then generates an automation recommendation 242 that recommends or does not recommend the target process for automation based on the distances between the vector for the target process and the vectors for the automated processes.

The machine learning models 246 may also include a collaborative filtering engine that makes automation recommendations based on the similarity of a target process to one or more automated processes. The collaborative filtering engine can include one or more filters that determine the similarity between the target process and the automated processes based on a comparison between the metadata of the target process and the metadata of the automated processes. The similarity ratings generated by each filter may then be pooled to determine a collective similarity rating. Comparisons between metadata fields that are more important and or less important to the automation recommendations 242 may be weighted. Weighting up the comparisons between the more important fields ensures the more important fields have more influence on the collective similarity rating. Weighting down the comparisons between the less important fields ensures the less important fields have less influence on the collective similarity rating. The collaborative filter engine generates automation recommendations 242 based on the similarity rating. For example, target processes that have a high similarity rating relative to an automated process will receive an automation recommendation 242 to generate an automation workflow for the target process. Target processes that have a low similarity rating relative to an automated process will receive an automation recommendation 242 not to generate an automation workflow for the target process.

The machine learning models 246 also generate suggested workflow templates 244 using one or more of the machine learning techniques described above. The suggested workflow templates 244 may include automation workflows for new processes that have not been automated and modified versions of workflow templates 212 that are adapted to user specific processes. For example, the machine learning models 246 may generate a suggested workflow template 244 for an invoice approval workflow that modifies the invoice approval workflow template 212 to fit a user specific approval hierarchy. To fit the user's approval hierarchy, the suggested workflow template 244 may suggest modifications to the workflow template 212. For example, the suggested modifications for the workflow template 212 for invoice approval may include suggestions to increase or reduce the number of review states and or actions required to complete an invoice approval process. The suggested workflow template 244 may also include suggested modifications that change the roles and permissions of users assigned to actions in the workflow template 212 to fit the roles and permissions of users included in the specific approval hierarchy.

The suggested workflow templates 244 are generated by machine learning models 246 trained on the application data described above and or design data generated in the design portal 220. For example, organizational hierarchies and roles and permissions of users in other applications may be used by the machine learning models 246 to generate suggested modifications to the review states, roles and permissions, and other aspects of workflow templates. Additionally, user design tendencies (i.e., frequent changes made to workflow templates 212 and or pre-configured attributes 214, the number of attributes included in custom workflows, the features of custom attributes, and the like) captured from inputs into the design portal 220 may be used by the machine learning models 246 to generate the suggested workflow templates.

Custom workflows 222 designed in the design portal 220 and or constructed based on automation recommendations 242 and or suggested workflow templates 244 are then auto-configured by the workflow model generation service 230. The workflow model generation service 230 augments the custom workflows 222 with workflow properties 232 to generate a workflow model file for the custom workflows 222. The workflow properties 232 make the custom workflows 222 compatible with the user specific systems and applications used to complete the automated process. For example, the workflow properties 232 include instructions that allow the workflow model files to be loaded by the orchestration layer 206 when users need to run one or more instances of the custom workflows 222. The workflow properties 232 also include parameters that integrate the custom workflows 222 with one or more in-product or external applications.

The workflow properties 232 may include user specific rules and conditional logic such as threshold values, department and location matching attributes, and the like. The workflow properties 232 enable the custom workflows 222 to be compatible with one or more in-product applications or external applications. The workflow properties 232 auto-configure the custom workflows 222 to integrate the custom workflows 222 with any user defined in-product and or external application. The custom workflows 222 can create tasks within the integrated in-product and or external application. To execute an automation workflow, the users complete the tasks created by the custom workflows 222 in the integrated in-product and or external applications to advance to the next stage in the workflows. The workflow properties 232 also allow events (e.g., entity creation, entity removal, data sync, and the like) that occur in the one or more in-product and or remote applications may be used as triggers for the custom workflows 222. The workflow properties 232 enable the custom workflows 222 to monitor events that occur in in-product and or external applications and detect certain events (e.g., entity creation events, entity update events, data syncs, user requests, and the like) as triggers that initiate execution of a custom workflow 222 and or a transition between one or more states included in the custom workflow 222. For example, creating an invoice entity in QuickBooks or another in—product accounting application may be detected as an event that triggers executing an invoice approval custom workflow. Other workflow properties 232 adapt the custom workflows 222 to fit user preferences and specific tools (i.e., applications and computer systems) used to complete the automation workflows. For example, the workflow properties 232 may include user preferences to send e-mails, SMS and mobile notifications, and other messages. Workflow properties 232 can also specify the duration between notifications as well the content of the notifications.

Each of the workflow model files 250A, . . . , 250N generated by the workflow model generation service 230 digitally manage and execute a user specific process. For example, the processes may include approvals, reminders and notifications, task management, data review, automatic updates, expert onboarding, expert engagement, and the like.

The workflow model files 250A, . . . , 250N include a plurality of workflow states 252 that include one or more actions 254 and triggers 256. The actions 254 include subtasks that are required to complete the process of the workflow model file 250A. Each workflow state 252 breaks up the process into multiple tasks (i.e., actions 254) that systematically progress the process from start to finish as the actions 254 within each workflow state 252 are completed. For example, the actions 254 included in a workflow model file for generating an invoice can include monitoring an application (e.g., a customer relationship management (CRM) application) to detect an event (e.g., a sale of a product or service), extracting data associated with the new event (e.g., customer id, transaction amount, transaction date, customer contract information, and the like) from the CRM application, populating the extracted data into an invoice or other document, distributing the document to one or more users for review, receiving approval of the document, distributing the document to the customer, and adding a piece of data from the document to an application or database (e.g., booking the amount of the invoice as an accounts receivable entry).

The triggers 256 may include particular events (i.e., completed actions and or tasks, started actions and or tasks, newly created data, updates to existing data, messages sent, messages received, and the like) associated with the workflow states 252. Accordingly, the workflow state 252 of each of the workflow model files 250A, . . . , 250N can be determined by detecting one or more triggers 256 associated with the workflow state 252. For example, an event bus included in the orchestration layer 304 may detect one or more triggers 256 in an activity that occurs within the applications monitored by the event bus. For example, the creation of a new and or updated contact in the CRM application may be detected as a trigger 256 that initializes execution of a workflow model file for creating a project estimate document for a product or service. In another example, the sale of a product through an e-commerce application may be detected as a trigger 256 that initializes a workflow model for creating an invoice and or receipt.

Other possible triggers 256 include the completion of one or more actions 254 included in each workflow state 252. For example, a confirmation that confirms an action 254 included in the workflow model file 250A is complete will be detected as a trigger 256 that identifies the workflow model file 250A as in the workflow state 252 that includes the particular action. Additionally, receiving confirmations for all actions 254 included in a workflow state 252 is another possible trigger 256 for transitioning the workflow model file 250A to a new workflow state 252. For example, receiving a confirmation that an invoice document has been completed will be detected as a trigger 256 that transitions the invoice creation workflow model file from a document creation workflow state to a document approval workflow state. In another example, receiving a confirmation that an invoice has been approved will be detected as a trigger 256 that transitions the invoice creation workflow model file from a document approval workflow state to a document delivery workflow state.

In the illustrated embodiment, each workflow model file 250A, . . . , 250N includes conditions 259. The conditions 259 will include one or more characteristics that must be present for the orchestration layer 206 to load a particular workflow model file 250A. The conditions 259 may include one or more characteristics of an event or other trigger 256. For example, a condition 259 for the invoice approval workflow model file may require the invoice amount to be above a certain amount threshold to initiate the automation workflow included in the invoice approval workflow model file. The conditions 259 may be pre-configured for workflow templates 212 included in the template library 210. The pre-configured conditions may be based on one or more default rules associated with a particular workflow template 212 and or corresponding conditions in an application connected to the workflow construction system 204. For example, a condition to require approval for invoices above $1,000 in an accounting application connected to workflow construction system 204 can be used to set up a condition on the invoice approval workflow model file to initiate the workflow model file only when invoices having an amount that exceeds $1,000 are created in the accounting application. The conditions 259 may also include custom conditions defined by the user. The custom conditions are auto-configured by the workflow construction system so they may be operable with the workflow model files 250A, ..., 250N without any manual coding or additional development time or resources.

In the illustrated embodiment, each of the workflow model files 250A, ..., 250N includes configuration data 258. Configuration data 258 includes a set of parameters that adapt the workflow model files 250A 250N to fit specific business processes. Configuration data 258 also includes a set of parameters that integrate the workflow model files 250A, ..., 250N with applications, computer systems, and other tools used to complete the tasks that are automated by the workflow model files 250A, ..., 250N. The configuration data 258 includes roles and permissions of users and or computer systems that interface with the workflow model files 250A, ..., 250N. The configuration data 258 may also include notification settings, security settings, application integrations for interfacing with other applications, model parameters (e.g., size, type of task, language, location, and the like) and other data that facilitates management and or execution of the workflow model files 250A, ..., 250N. For example, the roles and permissions may include the users assigned to complete the tasks included in the actions 254 (e.g., creating or editing documents, reviewing documents and or decisions, approving work completed by other users, drafting communications, and the like) and or the computer systems assigned to complete the automated tasks included in the actions 254 (e.g., data extraction, form generation, integrations, calculations, and the like). The roles and permissions may also include the users and or computer systems that may manage and or edit the workflow model files 250A, ..., 250N, change the current workflow state of the workflow model files 250A, ..., 250N, track the workflow state of die workflow model files 250A, ..., 250N, view and or edit data (e.g., documents, approval records, communications, and the like) generated during a particular workflow state of die workflow model files 250A, ..., 250N, and the like.

The roles and permissions can also include a particular approval hierarchy of an automation workflow included in a workflow model file. The approval hierarchy describes a particular sequence of approvals that must be completed in a particular order to complete the process of the workflow model file. The approval hierarchy assigns particular approval roles to users. The approval hierarchy may also provide users assigned to higher positions within the hierarchy with permissions to review and or change the approval actions completed by users assigned to lower positions in the hierarchy. The positions of particular users within the approval hierarchy may be automatically set-up based on an organization chart for a particular business and or business unit. The positions of particular users within the approval hierarchy may also be determined based on the roles and permissions of particular users within an application connected to the workflow construction system 204 (e.g., approval roles for general ledger entries made in an accounting application).

The notification settings may include contact information for the users and or computer systems assigned to complete the actions 254 included in the workflow model files 250A, ..., 250N. For example, the contact information may include a username, employee id, account name, email address, telephone number, and the like for users associated with one or more actions 254 and a device id, device endpoint, IP address, MAC address, and the like for computer systems associated with one or more actions 254. The notification settings can also include other communications parameters such as the actions 254 to be included in each notification generated during a particular workflow state and the frequency, type, and or timing of reminder notifications for incomplete actions 254. Notification settings for particular users and or computer systems may be automatically configured. For example, notification settings for actions 256 and other attributes 214 included in the workflow templates 212 may be extracted from the contact information for users and or computer systems included in applications connected to the workflow construction system 204.

The application integrations may include API and or other instructions for accessing and interacting with in-product and or external applications. In one or more embodiments, in-product applications are integrated with the workflow construction system 204 while external applications are separate from the workflow construction system 204. The application integrations may connect the workflow model files 250A, ..., 250N to an in-product accounting application and or an external email application to detect triggers 256 of the workflow model files 250A, ..., 250N. The application integrations may also connect the workflow model files 250A, ..., 250N to a third party portal or other application that delivers documents, messages, and other data generated during execution of the workflow model files 250A, ..., 250N to one or more third parties. The application integrations may also connect the workflow model files 250A, ..., 250N to an application that receives inputs thereto from users to complete actions 254.

The application integrations may also connect the workflow model files 250A, ..., 250N to an audit and or reporting application. The audit application can calculate performance metrics to evaluate the benefits and or drawbacks of automating business tasks using the workflow model files 250A, ..., 250N. For example, the performance metrics can include the time required to complete particular actions 254 and or workflow states 252, the total time required to complete all actions 254 and or workflow states 252 included in a workflow model file 250A, the number of reminder notifications required to complete actions 254 and or workflow states 252, the actions 254 that most frequently required one or more reminder notifications, the most frequently performed actions 254, the most frequently detected workflow states 252, the most frequently executed workflow model files 250A, ..., 250N, and or the maximum, minimum, average, and other statistical calculation based on the number of events and or time required to complete actions 256, workflow states 252, and or workflow model files 250A, ..., 250N. The performance metrics can also include the efficiency achieved or lost (i.e., a net time increase or decrease) by performing a particular task using the workflow model files 250A, ..., 250N relative to performing the particular task using manual methods and or other automation tools. The performance metrics can also determine the system performance of the server device and or orchestration layer 206 while loading, persisting, and or executing operations of the workflow model files 250A, . . . , 250N. For example, performance metrics may include the amount of memory allocated to the template library or the workflow model files 250A, . . . , 250N, the processing resources required to execute each workflow model file 250A and or a baseline number (e.g., 100, 1000, 10,000, or any other number) of instances of one or more workflow model files 250A, . . . , 250N simultaneously, the amount of storage required to persist the workflow model files 250A, . . . , 250N and or the workflow construction system 204, the cost required to maintain the computer system 200 running the workflow construction system 204, and the like. The performance metrics may be calculated for an individual workflow model file 250A and or a group of workflow model files 250A, . . . , 250N having any size and or composition (e.g., a group of six invoice generation workflow model instances and seven invoice approval workflow model instances).

The reporting application aggregates and organizes the performance metrics calculated by the audit application to generate one or more reports. The reports can be organized by type of workflow model file 250A, business unit(s) responsible for performing the tasks of the workflow model files 250A, . . . , 250N, period of time, machine instance running a particular implementation of the workflow construction system 204, and the like. To facilitate generating the reports, the application integrations will connect the reporting application to one or more word processing, chart drawing, other graphics and or document generation applications. The performance metrics calculated by the audit application and or the reports generated by the reporting application can be provided to one or more users and or computer systems having auditing and or reporting permissions in the roles and permissions of the configuration data 258. The reports and or performance metrics can be used to modify one or more aspects of the workflow construction system 204 to improve the performance of the workflow construction system 204 and or the efficiency of tasks required to design and build the workflow model files 250A, . . . , 250N relative to manual methods and other automation tools.

In the illustrated example, the workflow model files 250A, . . . , 250N are executed by the orchestration layer 204. The orchestration layer 204 will load a particular workflow model file 250A based on the detection of one or more of the workflow model file's triggers 256. For example, the orchestration layer 204 may load a workflow model file 250A in response to an event in an in-product or external application detected by an event bus. Other triggers 256 may also be detected by the event bus to cause the orchestration layer 204 to load one or more of the workflow model files 250A, . . . , 250N. The orchestration layer 204 may include multiple servers that may host instances of each workflow model file 250A and perform the operations required to complete the automation workflows included in the workflow model files 250A, . . . , 250N. The orchestration layer 204 dynamically scales the number of machines (i.e., servers) and or the available processing capacity, memory allocation, and storage of each server based on the number of workflow model files 250A, . . . , 250N and the number of instances of each workflow model files 250A executed at a given time. The orchestration layer 204 may also include a dispatcher that schedules and deploys the workflow model files 250A, . . . , 250N for execution by the multiple servers. The dispatcher may improve the efficiency and performance of the machines executing the operations of the workflow model files 250A, . . . , 250N by load balancing the processing, memory, and storage load across multiple machines. The orchestration layer 204 may also reduce the operating costs of implementing and executing workflow model files 250A, . . . , 250N by ensuring the computer system 200 only maintains machines hosting and executing workflow model files 250A, . . . , 250N and multiple instances of a particular workflow model file 250 are only persisted by the computer system 200 when users are executing at least two instances of the automation workflow included in the particular workflow model file 250A.

Figure 5:
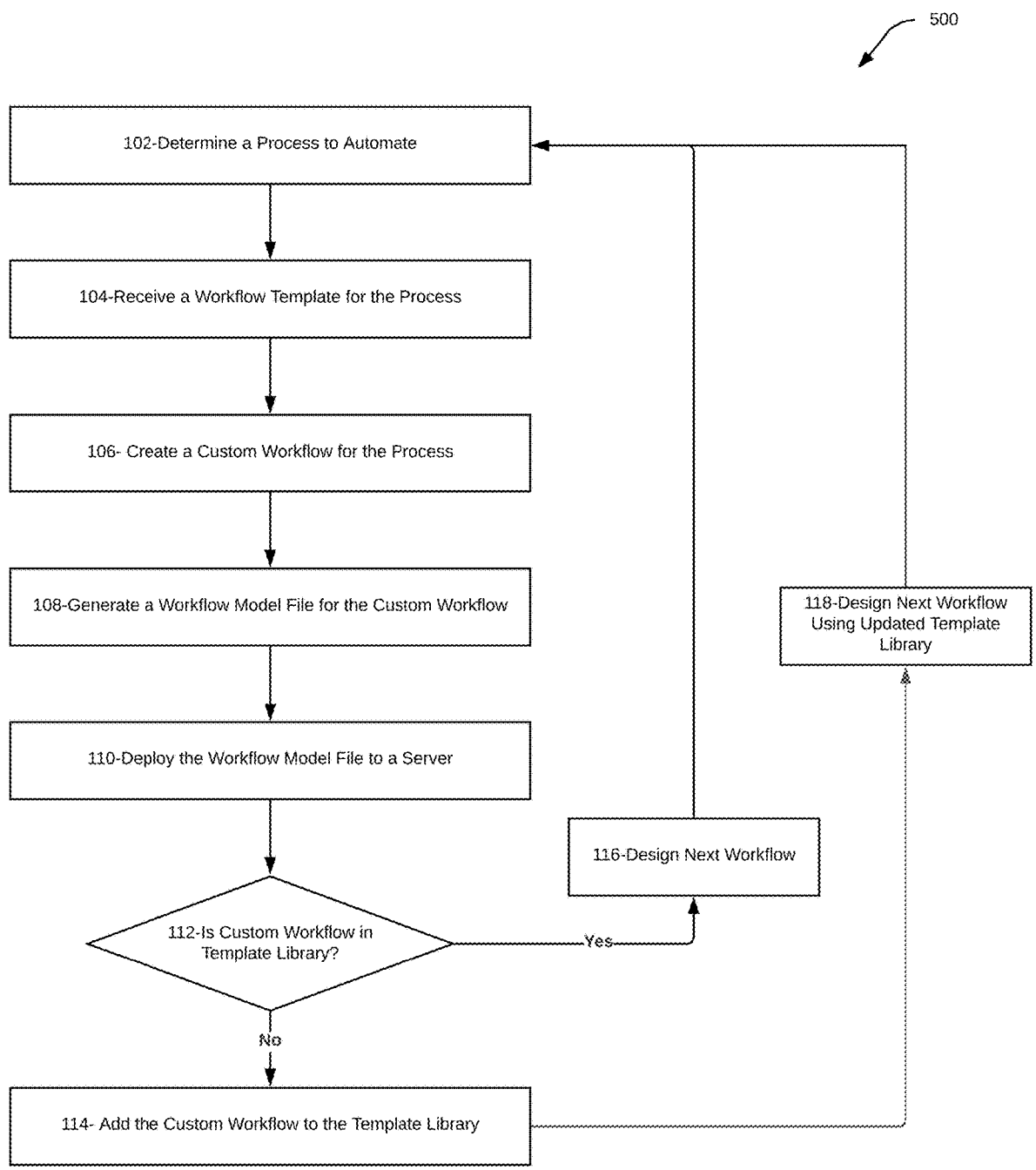
FIG. 5 a flow diagram illustrating an example process of building an automation workflow according to various embodiments of the present disclosure.

FIG. 5 illustrates an example process 500 for constructing an automation workflow. At step 102 the workflow construction system determines a process to automate using an automation workflow. For example, the workflow construction system may determine a process to automate based on a recommendation received from a machine learning model or manual input received from a user. The workflow construction system can expedite the design of the automation workflow using the template library. At step 104, the workflow construction system receives a workflow template from the template library. The received workflow template may be specifically designed for the process and may include multiple pre-configured attributes. If the template library does not include any workflow templates relevant to the process, the automation workflow may be designed from scratch using one or more of the pre-configured attributes and or custom attributes.

At step 106, a custom workflow is created for the process. The custom workflow may be based on the received workflow template. For example, the custom workflow may modify one or more attributes (e.g., workflow stages, actions, or triggers) of the workflow template to adapt the workflow template to fit a user specific process and operate on the user's specific systems and applications The workflow template may be modified based on user inputs received by the design portal and or suggested modifications generated by the machine learning models. At step 108, the workflow construction system generates a workflow model file for the custom workflow by adding multiple properties to the custom workflow.

At step 110, an orchestration layer deploys the workflow model file to a server that executes the automation workflow to complete an instance of the process. The orchestration layer can dynamically scale the processing resources, memory allocation, and storage of the server based on the size of the workflow model file and or the number of instances of the automation workflow demanded by users. To improve the performance of the system executing the workflow model file(s), the orchestration layer may spin up multiple servers and distribute the processing tasks required to load the workflow model file(s) and execute the automation workflow(s) across the multiple servers to balance the processing load handled by each server.

After the design process is complete, the custom workflow may be incorporated in to the workflow template library to facilitate rapid design of subsequent workflows. For example, if at step 112 the workflow construction system determines that the custom workflow is included in the template library (i.e., "yes" at step 112), the next workflow is designed using the existing template library at step 116. If the workflow construction system determines the custom workflow is not included in the template library (i.e., "no" at step 112), the custom workflow is added to the template library at step 114 and the next workflow is designed using the updated template library incorporating the custom workflow at step 118.

Figure 6:
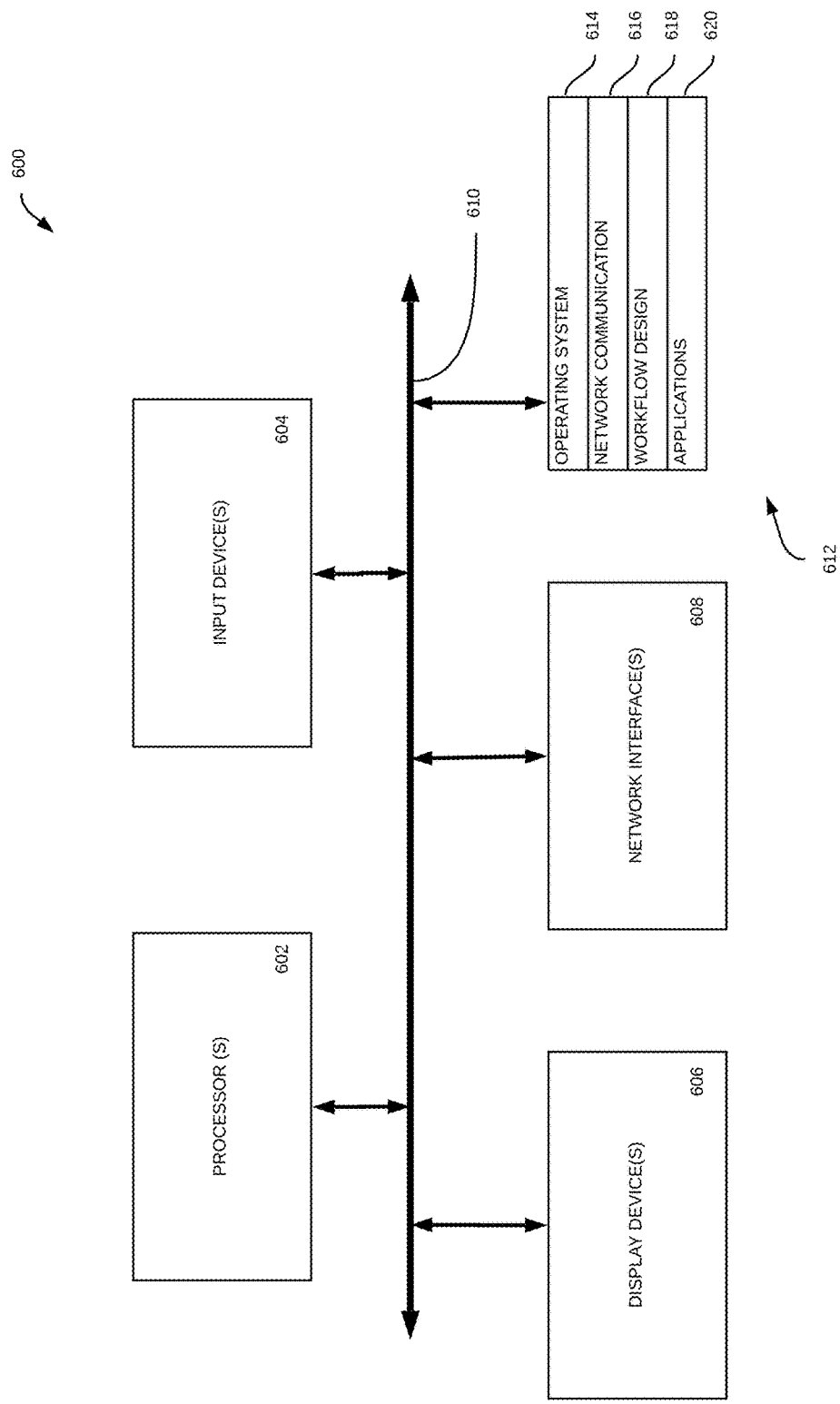
FIG. 6 is a block diagram illustrating an example computing device according to an embodiment of the present disclosure.

FIG. 6 shows an example computing device according to an embodiment of the present disclosure. For example, computing device 600 may function as client device 150, first server 120, and or second server 130. The computing device 600 may include a workflow construction system that designs and constructs the automation workflows as described above or a portion or combination thereof in some embodiments. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable mediums 612. Each of these components may be coupled by bus 610, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, camera, and touch-sensitive pad or display. Bus 610 may be any known internal or external bus technology, including but not limited to ISA, EISA, PCI, PCI Express, USB, Serial ATA or FireWire. Computer-readable medium 612 may be any non-transitory medium that participates in providing instructions to processor(s) 604 for execution, including without limitation, non-volatile storage media (e.g., optical disks, magnetic disks, flash drives, etc.), or volatile media (e.g., SDRAM, ROM, etc.).

Computer-readable medium 612 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 612; controlling peripheral devices (e.g., disk drives, printers, etc.) which can be controlled directly or through an I/O controller; and managing traffic on bus 610. Network communications instructions 616 may establish and maintain network connections (e.g., software for implementing communication protocols, such as TCP/IP, HTTP, Ethernet, telephony, etc.).

Workflow design instructions may include instructions that enable computing device 600 to function as a workflow construction system and/or to provide workflow construction system functionality as described herein. Application(s) 624 may be an application that uses or implements the processes described herein and/or other processes. The processes may also be implemented in operating system 614. For example, application 624 and/or operating system may present UIs 152 for generating workflow designs as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of constructing automation workflows, the method comprising:
   receiving a workflow template for a process from a template library including multiple workflow templates, the workflow template including multiple pre-configured attributes,
   wherein the pre-configured attributes include multiple actions and each action includes a task required to complete a portion of the process;
      creating a custom workflow for the process by modifying the workflow template, the modifying including at least one of changing at least one of the multiple actions or adding an auto-configured user defined action to the workflow template, the custom workflow including at least one custom attribute that is different from the pre-configured attributes;
      generating a workflow model file for the custom workflow by adding multiple workflow properties to the custom workflow, wherein the multiple workflow properties integrate the custom workflow with an application;
      deploying the workflow model file to execute the automation workflow and complete an instance of the process,
   wherein the execution comprises automatic implementation of the multiple actions, and wherein the automatic implementation of at least one of the multiple actions triggers a transition of the automation workflow; and
   adding the custom workflow to the multiple workflow templates included in the template library.

2. The method of claim 1, further comprising generating the pre-configured attributes by least one of pre-coding integrations with the application connected to the multiple workflow templates, automatically assigning at least one set of roles and permissions for at least one user participating in the multiple workflow templates, or automatically setting at least one condition for initializing a model file of at least one of the multiple workflow templates.

3. The method of claim 1, further comprising:
   aggregating data from multiple applications connected to the automation workflow; and
   determining the process to automate using a machine learning model that analyzes the data aggregated from the multiple applications.

4. The method of claim 3, further comprising training the machine learning model using training data that is specific to at least one of the multiple applications connected to the automation workflow, a particular subject matter, or a particular type of process.

5. The method of claim 1, further comprising:
   aggregating data from multiple applications connected to the automation workflow; and
   generating a suggested modification to the workflow template using a machine learning model that analyzes the data aggregated from the multiple applications.

6. The method of claim 5, wherein the suggested modifications include at least one of a change to a workflow state of the workflow template, a change to an action included in the workflow template, or a change to a set of roles and permissions for at least one user participating in the custom workflow.

7. The method of claim 1 further comprising:
   initiating multiple instances of the workflow model file in response to a demand for completing the process multiple times;
   deploying the multiple instances of the workflow model file to a server; and
   dynamically scaling processing resources of the server allocated to the multiple instances workflow model file to improve performance of the server while executing the multiple instances of the workflow model file.

8. The method of claim 1 further comprising calculating a performance metric for the workflow model file that describes a measure of efficiency of completing the process using the workflow model file relative to completing the process using an alternate method;
   generating a report including the performance metric; and
   distributing the report to one or more users through an audit application based on roles and permissions.

9. A system for constructing automation workflows, said system comprising:
   a repository configured to store a template library including multiple workflow templates; and
   a workflow construction system, executing on a processor and being configured to:
   receive a workflow template for a process from the template library, the workflow template including multiple pre-configured attributes,
   wherein the pre-configured attributes include multiple actions and each action includes a task required to complete a portion of the process;
      create a custom workflow for the process by modifying the workflow template, the modifying including at least one of changing at least one of the multiple actions or adding an auto-configured user defined action to the workflow template, the custom workflow including at least one custom attribute that is different from the pre-configured attributes;
generate a workflow model file for the custom workflow by adding multiple properties to the custom workflow, wherein the multiple workflow properties integrate the custom workflow with an application;
deploy the workflow model file to execute the automation workflow and complete an instance of the process,
wherein the execution comprises automatic implementation of the multiple actions, and wherein the automatic implementation of at least one of the multiple actions triggers a transition of the automation workflow; and
add the custom workflow to the multiple workflow templates included in the template library.

10. The system of claim 9, wherein the workflow construction system is further configured to generate the pre-configured attributes by least one of pre-code integrations with an application connected to the multiple workflow templates, automatically assign at least one set of roles and permissions for at least one user participating in the multiple workflow templates, or automatically set at least one condition for initializing a model file of at least one of the multiple workflow templates.

11. The system of claim 9, further comprising a machine learning model stored in the repository,
wherein the workflow construction system is further configured to aggregate data from multiple applications connected to the automation workflow; and
determine the process to automate based on an analysis of the data aggregated from the multiple applications performed by the machine learning model.

12. The system of claim 11, wherein the workflow construction system is further configured to train the machine learning model using training data this is specific to at least one of the multiple applications connected to the automation workflow, a particular subject matter, or a particular type of processes.

13. The system of claim 9, further comprising a machine learning model stored in the repository,
wherein the workflow construction system is further configured to aggregate data from multiple applications connected to the automation workflow; and
generate a suggested modification to the workflow template based on an analysis of the data aggregated from the multiple applications performed by the machine learning model.

14. The system of claim 13, wherein the suggested modifications include at least one of a change to a workflow state of the workflow template, a change to an action included in the workflow template, or a change to a set of roles and permissions for at least one user participating in the custom workflow.

15. The system of claim 9, wherein the workflow construction system is further configured to initiate multiple instances of the workflow model file in response to demand for completing the process multiple times;
deploy the multiple instances of the workflow model file to a server; and
dynamically scale processing resources of the server allocated to the multiple instances of the workflow model file to improve performance of the server while executing the multiple instances of the workflow model file.

16. The system of claim 9, wherein the workflow construction system is further configured to calculate a performance metric for the workflow model file that describes a measure of efficiency of completing the process using the workflow model file relative to completing the process using an alternate method;
generate a report including the performance metric; and
distribute the report to one or more users through an audit application based on roles and permissions.

* * * * *